United States Patent [19]
Stamatakis

[11] Patent Number: 6,148,844
[45] Date of Patent: Nov. 21, 2000

[54] CONDENSATE REMOVAL DEVICE

[75] Inventor: E. Michael Stamatakis, St. Louis, Mo.

[73] Assignee: Steam Tech, Inc., St. Louis, Mo.

[21] Appl. No.: 09/345,937

[22] Filed: Jul. 1, 1999

Related U.S. Application Data

[60] Provisional application No. 60/091,351, Jul. 1, 1998.

[51] Int. Cl.[7] .................................................. F16T 1/00
[52] U.S. Cl. ...................... 137/179; 137/177; 137/183; 137/269; 55/466
[58] Field of Search ..................................... 137/177, 179, 137/183, 269; 55/466

[56] References Cited

U.S. PATENT DOCUMENTS

| | | | |
|---|---|---|---|
| 2,074,690 | 3/1937 | Gerdts .................................... | 137/177 |
| 3,776,254 | 12/1973 | Alesson et al. ......................... | 137/183 |
| 4,134,541 | 1/1979 | Beatty .................................. | 137/183 X |
| 4,171,209 | 10/1979 | Brown .................................. | 55/466 |
| 4,288,032 | 9/1981 | Hetz .................................... | 137/269 X |
| 4,296,771 | 10/1981 | Claffy et al. ......................... | 137/183 X |
| 4,426,213 | 1/1984 | Stavropoulos ......................... | 55/466 |
| 4,592,381 | 6/1986 | Troy .................................... | 137/203 |
| 4,745,943 | 5/1988 | Mortensen ............................. | 137/177 |
| 5,088,518 | 2/1992 | Stamatakis et al. .................... | 137/171 |

OTHER PUBLICATIONS

"Steam Traps–More Myths," Proceedings of the 9th World Energy Engineering Congress, F. Dickman, Oct. 1986, pp. 473–479.

*Primary Examiner*—Gerald A. Michalsky
*Attorney, Agent, or Firm*—Senniger, Powers, Leavitt & Roedel

[57] ABSTRACT

A condensate removal device for removal of condensate from a fluid system. The device includes a body adapted for connection to the fluid system, the body having an inflow opening and an outflow opening. A trap between the inflow opening and the outflow opening restricts flow of fluid to permit the passage of liquid condensate but to inhibit the passage of gas. The trap includes a fixed passageway extending through the trap constructed for continuous fluid communication between the inflow opening and the outflow opening through the trap. A variable passageway extends through the trap, the variable passageway being constructed to selectively permit fluid communication between the inflow opening and outflow opening through the variable passageway in correspondence with the amount of liquid condensate in the fluid system. The device may include a labyrinth path to trap steam and pass condensate and be constructed to promote heat transfer and condensation of steam within the trap.

11 Claims, 4 Drawing Sheets

CONDENSATE REMOVAL DEVICE

This application claims the benefit of provisional application Ser. No. 60/091,351, filed Jul. 1, 1998.

BACKGROUND OF THE INVENTION

This invention relates generally to condensate removal devices in gas piping systems, and more particularly to a modular steam trap for removal of water condensate from steam pipes.

Steam is an efficient and widely used heat transfer medium for transporting energy. An unavoidable by-product when using steam is liquid condensate (i.e., water) that forms when heat is transferred away from steam along pipes or at heat exchangers. When condensate collects inside pipes or other components, system efficiency is significantly degraded. Condensate also can cause a destructive water hammer, a shock wave that damages components and can cause serious injury to people nearby. Accordingly, condensate should be removed from steam systems as it forms.

A steam trap is a mechanical device used to drain condensate while retaining or "trapping" steam. Traps are typically positioned at natural low points in steam systems where condensate collects or ahead of control valves where condensate could impede proper valve operation. Most traps operate using the inherent difference in density between liquid and gas to separate the fluids. Ideally, each trap should be capable of draining a massflow, or load, of condensate that flows to its location in the steam system. Each trap should also be reliable in operation to avoid costly inefficiencies that arise when condensate collects or when live steam is released from a defective trap. Several types of steam traps are commonly available. Some are complex in design and subject to fail without frequent maintenance.

One type of trap that is economical and reliable is a fixed orifice trap. A relatively small hole or a tubular passageway in a trap permits condensate to drain through. These traps are comparatively inexpensive and there are no moving parts to corrode or fail. They are very effective in draining condensate while preventing release of live steam. The condensate flowing in a fixed orifice generally blocks entry of steam. However if steam does enter the orifice, it would be desirable to condense the steam into water to block entry of additional steam into the trap.

A drawback to fixed orifice traps is that they cannot accept large variation in condensate load. The diameter of the orifice is fixed, and therefore the capacity of the trap, which is proportional to area of the orifice and the flow velocity, is also substantially fixed. Orifices are sized to drain an expected load. The actual load, however, can increase by a factor of four or more if ambient temperature decreases, causing heat transfer rates from the steam to increase and causing formation of a larger quantity of condensate. In the past, this has been partially compensated for by over-sizing the orifice for the particular application. An over-sized orifice not only passes more load, but possesses a valuable secondary benefit of a greater ability to pass solid debris. Small deposits of corrosion or other particulate matter may become mixed within the flow of condensate and can clog the trap. There is less tendency for solid particles to lodge in an orifice or passageway that is relatively larger. However, a trap having an orifice that is larger than needed for ordinary loads tends to permit release of live steam and is inefficient.

A second type of trap is a thermodynamic or disk type trap. An obstruction comprising a flat disk is freely captured in the trap and is movable between a closed position in which the disk blocks flow of fluid through the trap, and an open position in which the disk permits flow of fluid. The disk may cycle between open and closed positions, and when in the open position the trap is capable of handling a greater quantity of condensate load than a fixed orifice trap. Condensate flow initially raises the disk open as it flows in. When steam arrives it changes the local pressure and lowers the disk, closing the trap, which stays closed as long as relatively higher pressure is maintained above the disk. At each cycle, there is an inherent time delay for closing the disk, as is common in thermodynamic traps, during which some live steam is released from the trap. So although the thermodynamic trap is beneficial in draining a large quantity of load, it has inherent inefficiency.

Typically it is not clear which type of trap is best suited for application at a location in a steam system. Fluid flow conditions, including pressure, temperature, condensate load, and amount of solid debris vary from one region of a system to another. Accordingly, different types of trapping modules may be more appropriate for placement in certain areas of the steam system. Unfortunately, knowledge of flow conditions is uncertain, and the conditions vary over time. In practice, many operators maintain a large and cumbersome inventory of several types of steam traps, and they choose one trap appropriate to estimated flow conditions. Operators may need to change steam traps because of altered or mistakenly estimated conditions. When an installed trap is removed and replaced, it often requires breaking a steam line, resulting in substantial downtime for the entire steam system.

SUMMARY OF THE INVENTION

Among the several objects and features of the present invention may be noted the provision of a condensate removal device for a fluid system for a gas such as steam which is efficient in both constant load and variable load situations; the provision of such a device which inhibits release of steam while permitting removal of condensate and small solid debris; the provision of such a device which is reliable in operation; the provision of such a device which is easily maintained; the provision of such a device which is modular; and the provision of such a device that is economical.

Briefly, a condensate removal device of the present invention removes condensate from a fluid system. The device comprises a body adapted for connection to the fluid system, the body having an inflow opening and an outflow opening. A trap between the inflow opening and the outflow opening restricts flow of fluid from the fluid system entering the inflow opening to the outflow opening to permit the passage of liquid condensate but to inhibit the passage of gas. The trap comprises a fixed passageway extending through the trap, the fixed passageway being constructed for continuous fluid communication between the inflow opening and the outflow opening through the trap. A variable passageway extends through the trap, the variable passageway being constructed to selectively permit fluid communication between the inflow opening and outflow opening through the variable passageway in correspondence with the amount of liquid condensate in the fluid system.

In another aspect, a condensate removal device of the present invention for removal of condensate from a fluid system comprises a body adapted for connection to the fluid system, the body having an inflow opening and an outflow opening. A trap between the inflow opening and the outflow opening restricts flow of fluid from the fluid system entering the inflow opening to the outflow opening to permit the passage of liquid condensate but to inhibit the passage of gas. The trap comprises a passageway extending through the trap, the passageway being relatively narrower than the inflow opening and substantially free from obstruction. The passageway has a labyrinth configuration so that the passageway is longer than a path extending straight through the trap to provide improved inhibition to passage of gas.

In yet another aspect, a condensate removal device for removal of condensate from a fluid system comprises a body adapted for connection to the fluid system, the body having an inflow opening, an outflow opening, and a transverse opening positioned generally between the inflow opening and the outflow opening. A trap receivable in the transverse opening of the body between the inflow opening and the outflow opening restricts flow of fluid from the fluid system entering the inflow opening to the outflow opening to permit the passage of liquid condensate but to inhibit the passage of gas. The trap has an upper surface facing outwardly from the transverse opening. A cover adapted for placement generally over the transverse opening and for releasable attachment to the body holds the trap in the body. The cover is shaped to overlie a first portion less than all of the upper surface of the trap, leaving a second portion of the upper surface in heat transfer communication with the ambient surroundings to facilitate heat transfer.

Other objects and features of the present invention will be in part apparent and in part pointed out hereinafter.

BRIEF DESCRIPTION OF THE DRAWINGS

Corresponding reference characters indicate corresponding parts throughout the views of the drawings.

DETAILED DESCRIPTION OF THE PREFERRED EMBODIMENTS

Figure 1:
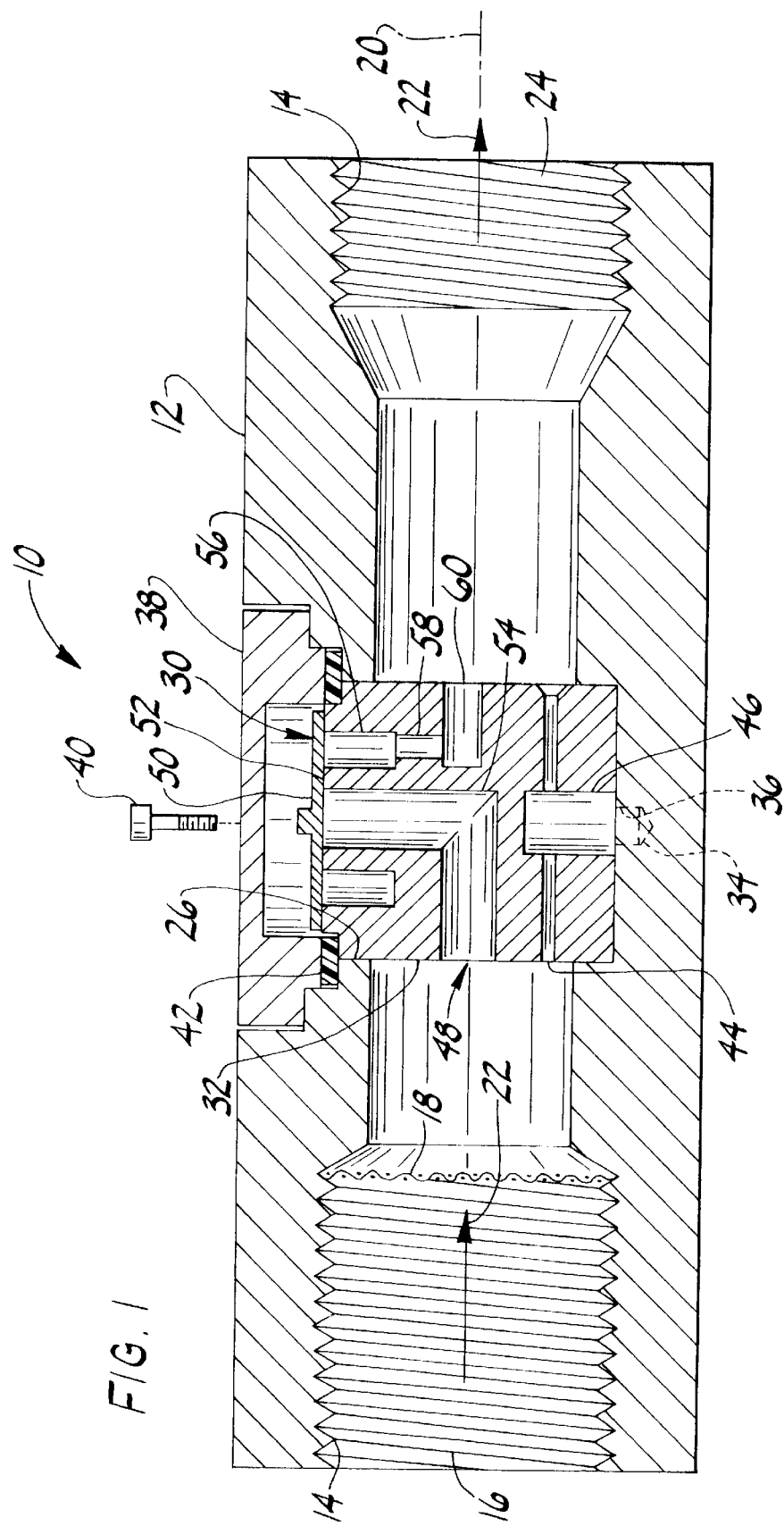
FIG. 1 is a longitudinal section of a first embodiment of a condensate removal device of the present invention including a trap in the form of a modular block.

Referring now to the drawings, and in particular to FIG. 1, a first embodiment of a modular condensate removal device is indicated generally at 10. The device has a tubular body 12 with internal threading 14 for connection to pipes in a fluid system (not shown). Although the device 10 is applicable for use in various gas and liquid fluid systems, its primary application is to steam transportation systems and will hereinafter be described with reference to use in a steam system.

The body 12 has an inflow opening 16 that functions as an entryway into the device. The threading 14 of the inflow opening 16 engages corresponding external threads on a steam pipe (not shown) to connect the device 10 to the fluid system. It is expected that the device 10 will be installed in the fluid system at a location where condensate needs to be removed, such as at one of several low elevation points in the system or ahead of a flow control valve. Both gaseous steam and liquid water condensate enter the inflow opening 16. A mesh screen 18 is disposed across the inflow opening 16 for filtering from the fluid any solid deposits or particles such as chunks of rust that could lodge in the device and clog its operation. The device is configured to be installed in the system with a longitudinal axis 20 of the tubular body 12 oriented horizontally. Flow moves horizontally from left to right in FIG. 1, as illustrated by arrows 22.

The body has an outflow opening 24 that functions as an exit from the device for liquid condensate that is removed from the steam system. The threading 14 of the outflow opening 24 engages corresponding external threads on a return pipe (not shown). Condensate is delivered from the outflow opening 24 to the return pipe which in turn delivers condensate to a suitable discharge location, such as a boiler where the water may be re-used.

The body 12 has a transverse opening 26 in its upper side that extends vertically downward through most of the diameter of the body, but not completely through the body. The transverse opening 26 is generally cylindrical and is positioned between the inflow opening 16 and the outflow opening 24.

A trap indicated generally at 30 is received in the transverse opening 26 and positioned between the inflow opening and the outflow opening for restricting flow of fluid to permit the passage of water condensate but to inhibit the passage of steam. The trap 30 preferably comprises a modular block 32 which is cylindrical in shape and is sized to fit within the transverse opening 26. The block 32 is detachably removable from the body 12 and is selectively interchangeable with other similarly sized and shaped modular blocks. A positioning pin 34 on a lower surface of the modular block 32 is configured to be received in a positioning hole 36 in the body 12 for orienting the modular block in the body, and preventing backwards or misaligned installation. Alternatively, the positioning pin 34 may be on the body and the positioning hole 36 in the modular block.

The trap 30 is held in the transverse opening 26 by a cover 38. After insertion of the modular block 32 into the transverse opening, the cover 38 is placed generally over the trap. Two bolt fasteners 40 extend through the cover 38 and are received in the body 12 to secure the cover to the body and hold the trap in the transverse opening. An elastomeric gasket 42 is circumferentially positioned around the transverse opening 26 between the cover 38, body 12, and modular block 32 to prevent fluid leakage from between the body and the modular block.

Because a fixed orifice type of steam trap is advantageously economical and requires low maintenance, each embodiment of the present invention includes a modular block that has a fixed orifice and associated fixed passageway type flow restriction. Each fixed passageway is constructed for continuous fluid communication between the inflow opening 16 and the outflow opening 24 through the trap. Each embodiment includes additional features as described below that minimize any negative aspects of a fixed orifice type trap while maintaining its advantages.

The trap 30 of the first embodiment shown in FIG. 1 includes a horizontal fixed passageway 44 extending through the trap. A diameter of the fixed passageway is selected to adequately drain an estimated ordinary quantity of condensate load. The fixed passageway 44 is positioned in a lower portion of the modular block 32 whereby liquid condensate that collects in the bottom of the inflow opening 16 may flow through the fixed passageway. Further, the low positioning of the fixed passageway 44 minimizes occurrence of steam entering the passageway, since gravity favors liquid being in the lower portion with gas above. In the event that steam enters the passageway 44, a chamber 46 is positioned within the fixed passageway for expanding steam as it flows out from a first section of the passageway into the chamber. When steam expands, it is more likely to condense into water, and therefore the chamber 46 impedes release of steam from the trap. There may be multiple chambers (not shown) disposed in the passageway 44.

When actual load is significantly larger than the estimated load for which the fixed passageway 44 is sized, condensate can not be adequately drained through the fixed passageway. Condensate collects in the inflow opening 16 and rises in elevation therewithin. A variable passageway, indicated generally at 48, extends through the trap 30, and is constructed to selectively permit fluid communication between the inflow opening and outflow opening in correspondence with the amount of liquid condensate in the fluid system.

The variable passageway 48 comprises a thermodynamic or disk type trap which is capable of handling a greater variance in load than the fixed passageway 44. An obstruction comprising a flat disk 50 is freely captured in the variable passageway between the cover 38 and a sealing seat 52. The disk 50 is movable between a closed position (shown in FIG. 1) in which the disk engages the seat 52 and blocks flow of fluid through the variable passageway 48, and an open position in which the disk permits flow of fluid through the variable passageway.

An L-shaped portion 54 of the variable passageway extends generally from the inflow opening 16 to the disk 50, when the disk is at the closed position. An annular outflow groove 56 is formed in the upper end of the modular block 32 that may also be closed by the disk 50. An outflow hole 58 in the bottom of the groove 56 communicates with an outlet 60 for permitting condensate to flow out of the trap to the outflow opening 24. Each portion of the variable passageway 48, including the L-shaped portion, outflow groove, and outflow hole, is significantly larger in available flow area than the fixed passageway 44. Therefore the variable passageway 48, when open, may pass substantially greater load through the trap than the fixed passageway 44.

Thus the trap 30 of the first embodiment is configured for dual operation to capture the benefits of two conventional types of steam traps. The fixed passageway 44 operates continually as a fixed orifice type trap for generally constant or ordinary load conditions, and maintains high efficiency. It is expected that the fixed passageway 44 will provide all the drainage needed during standard operations, and the variable passageway 48 will be inoperative. The variable passageway 48 operates only intermittently or as needed as a thermodynamic type trap for high load situations, permitting drainage of unusually large quantities of condensate. Thus, the device 10 has a variable capacity, but only uses the variable capacity when needed. Moreover, the fixed passageway does not need to be over-sized for even better efficiency under normal condensate loads.

The condensate removal device 10 of the present invention is constructed of a material suitable for installation in high pressure and temperature steam systems. In practice, steel has been effectively used in constructing each element (except the elastomeric gasket 42), although elements made of other materials do not depart from the scope of this invention.

Figure 2:
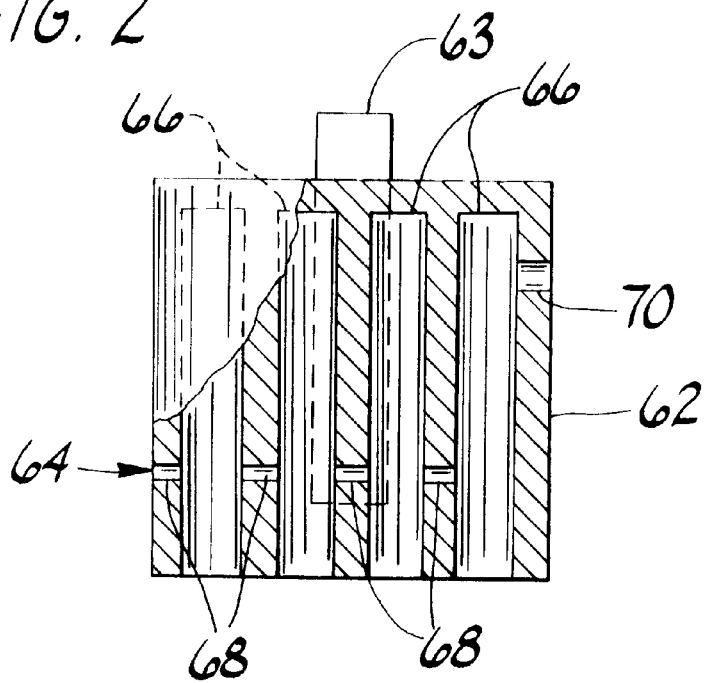
FIG. 2 is a partially sectional side view of a modular block of a second embodiment.

Referring now to FIG. 2, a modular block of a second embodiment is indicated generally at 62. The block 62 is selectively interchangeable in the transverse opening 26 with the block 32 of the first embodiment, being identically sized and shaped as the first block. A positioning pin 63 is positioned on an upper surface of the modular block 62 and is configured to be received in a corresponding hole in a cover (not shown) for orienting the block in the body 12. The pin 63 functions similarly as the positioning pin 34 on the first embodiment, as well as providing a gripping point when removing the block 62 from the body. The second modular block 62 has a single passageway 64 therein that is constructed for continuous fluid communication between the inflow opening 16 and the outflow opening 24 through the second modular block when received in the body 12. The single passageway 64 is fixed and configured in a labyrinth configuration that is longer than a passageway extending straight through the trap to provide improved inhibition to passage of steam.

Figure 4:
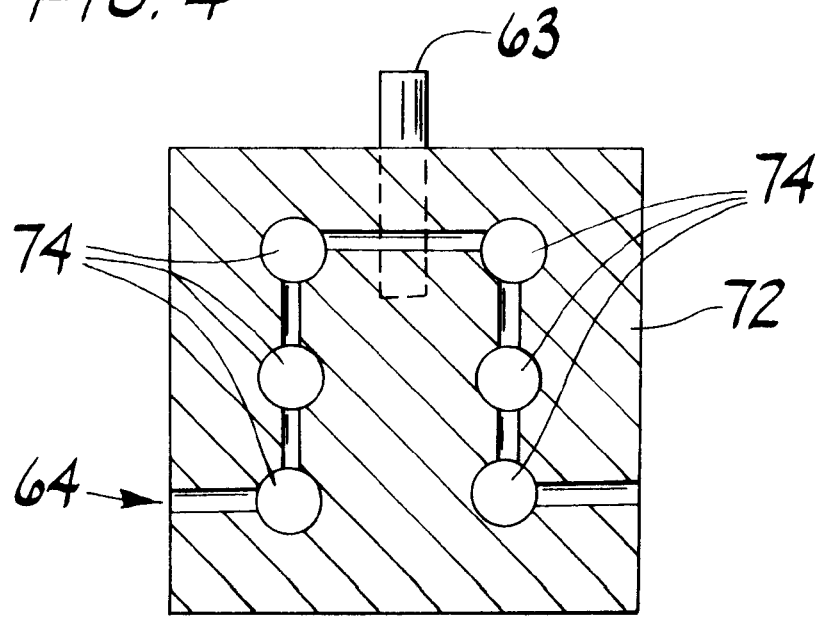
FIGS. 4–6 are sectional side views of alternate modular blocks.

The labyrinth configuration of the fixed passageway 64 can take several forms. The form of the second modular block 62 shown in FIG. 2 includes four cylindrical, parallel vertical chambers 66. The single passageway 64 extends in five successive straight, horizontal sections through the modular block. The first four sections, indicated at 68, are collinear and are spaced apart by the chambers 66. The fifth section, indicated at 70, is not collinear with the first four sections, but is elevated relative to them. Various other forms of this labyrinth configuration are possible and do not depart from the scope of this invention. For instance, as shown in FIG. 4, a modular block 72 includes several spaced, parallel chambers 74 that are oriented horizontally. The single passageway 64 extending through the modular block 72 passes between these chambers 74 in a variety of successive sections that may be disposed horizontally, vertically, or angularly. The sections of the passageway 64 are not all collinear so that there is no direct or straight-through path extending through the trap.

The labyrinth configuration inhibits the passage of any steam that enters the trap 30. It forces any steam to pass through a greater distance in the fixed passageway 64 than in a straight-through configuration such as passageway 44 on FIG. 1. Steam is impeded in passing through the blocks 62, 72, more so than in a straight-through configuration, because the greater length exposes steam to additional cooling, additional flow turbulence, and additional expansion. Each of these factors tend to condense steam into water droplets.

Figure 3:
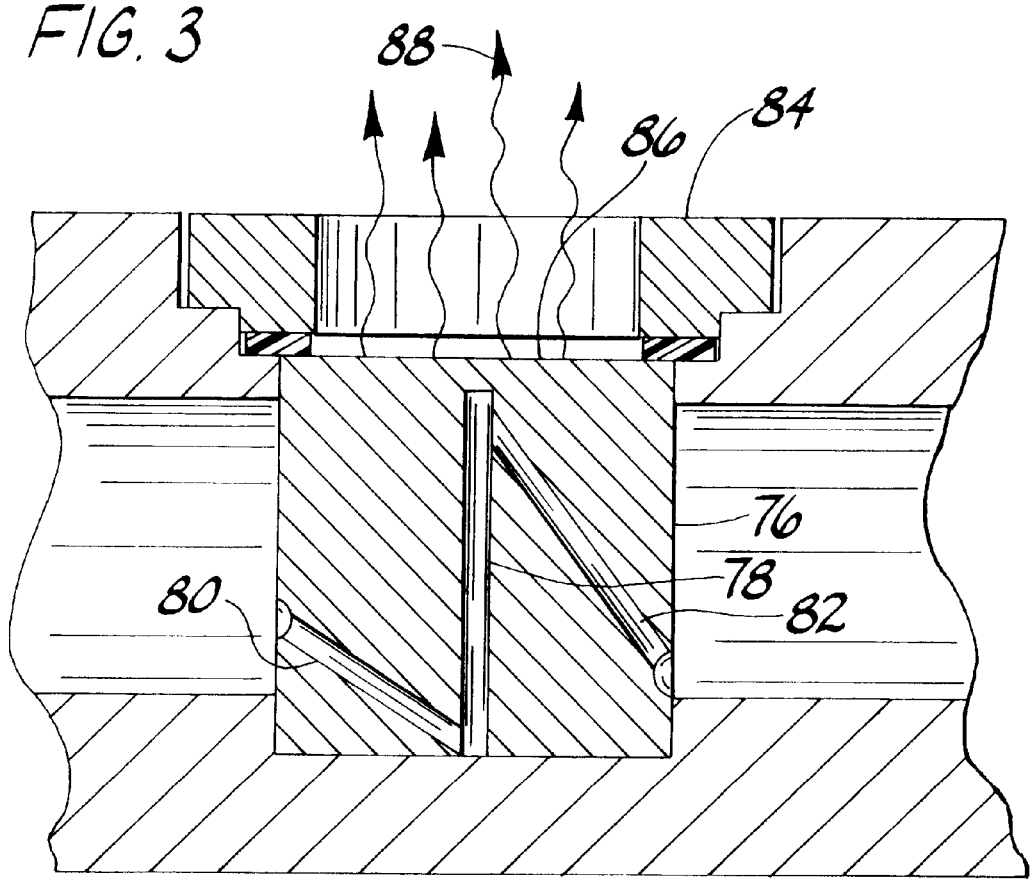
FIG. 3 is a partial longitudinal section of a third embodiment.

A third embodiment of the condensate removal device 10 is shown in FIG. 3. A third modular block 76 has the single, fixed passageway 64 therein. The third block 76 is selectively interchangeable in the transverse opening 26 of the body 12 with other blocks. The passageway 64 is constructed for continuous fluid communication between the inflow opening 16 and the outflow opening 24 through the third modular block when received in the body. As within the blocks 62 and 72, the passageway 64 is fixed and configured in a labyrinth configuration that is longer than would be a straight-through configuration to provide improved inhibition to passage of steam. The block 76 includes a single vertical chamber 78. The passageway 64 includes a first angled section 80 that delivers fluid to a lower portion of the chamber 78, and a second angled section 82 that delivers fluid from an upper portion of the chamber to the outflow opening 24. As with the other labyrinth configurations, flow of steam is exposed to additional cooling, turbulence, and expansion than in a straight-through configuration, tending to condense the steam into water. Steam must pass through the first angled section 80, then up through the vertical chamber 78, and then through the second angled section 82 in order to pass through the trapping device.

A significant advantage of the embodiments shown in FIGS. 2, 3, and 4 is that each fixed passageway 64 may be oversized to avoid clogging. Because a labyrinth configuration inhibits passage of steam more so than a straight-through configuration, the diameters of the passageway sections may be larger without permitting a detrimental release of steam. The wider passageways allow larger particles of solid debris to pass through without becoming lodged therein, avoiding any clogging of the device 10. Thus, the invention improves reliability and reduces maintenance.

A cover 84, shown in the third embodiment of FIG. 3, is shaped for being secured to the body and to overlie a portion less than all of an upper surface 86 of the modular block 76. An uncovered portion of the upper surface 86 is exposed to ambient air to facilitate transfer of heat energy to ambient surroundings, as indicated by arrows 88 on FIG. 3. In the preferred mode, the cover 84 is annular in shape, having a hole generally at its center. The shape permits the modular block 76 to cool more effectively than when completely covered. Therefore, the modular block tends to reach a lower temperature, and steam passing therethrough is additionally cooled and has a greater tendency to condense into water. The cover 84 may be used with other modular blocks, provided that any block does not have a disk requiring containment as in FIG. 1.

Figure 7:
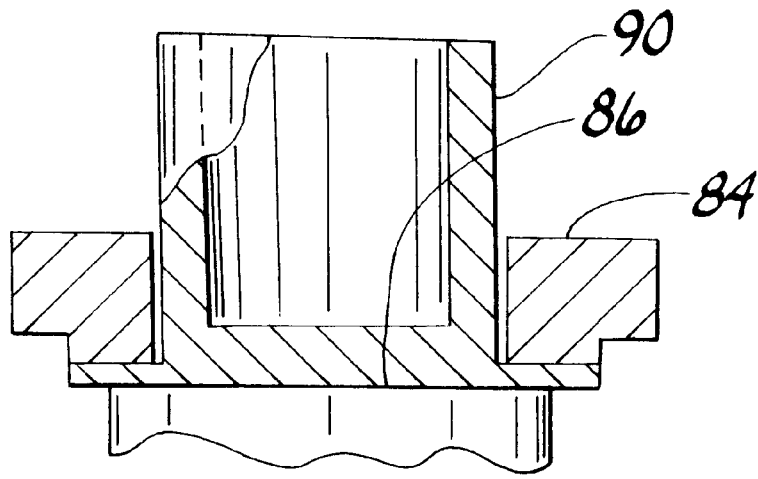
FIG. 7 is a partial sectional side view of a radiation fin above a modular block.

Alternatively, the cover may have a radiation fin 90, as shown in FIG. 7, that engages the upper surface 86 and extends upwardly for facilitating heat energy transfer away from the trap to the ambient surroundings for improved cooling of the modular block 76. The fin 90 is generally cylindrical and annular in cross-section, and it may be made of a material suitable for effective thermal conductivity and radiation, such as aluminum or copper. Fins having other shapes or made of other materials do not depart from the scope of this invention. The fin 90 extends upwardly through the hole of the annular shaped cover 84 to a suitable height above the cover, such as a height equal to between 10% and 50% of an outer diameter of the body 12, where the fin can effectively transfer heat. The fin 90 receives heat from the modular block 76 and transfers it away to the ambient surroundings. The fin may be used with other modular blocks that have a flat upper surface.

Figure 5:
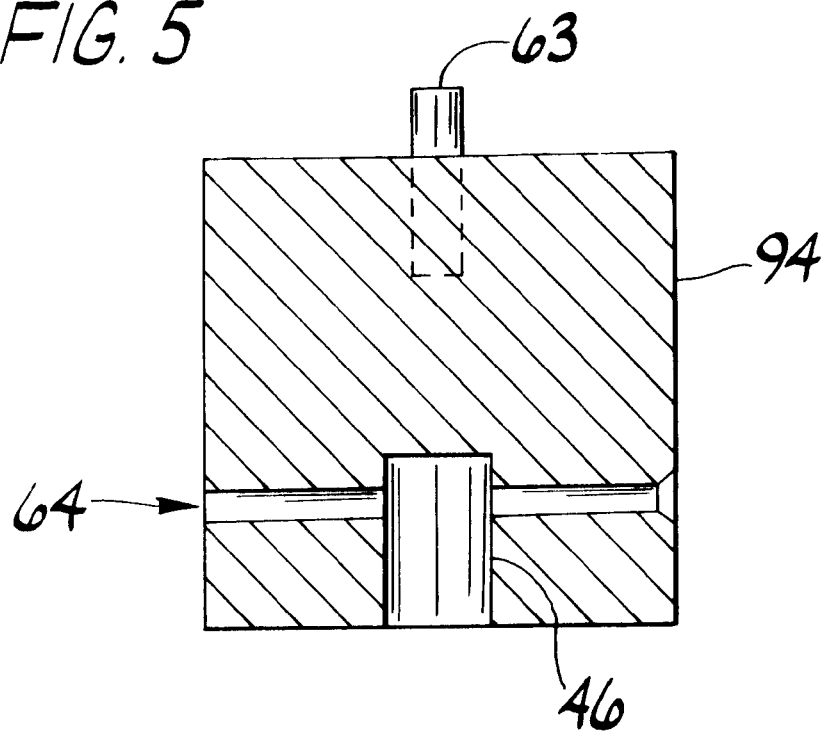
Figure 6:
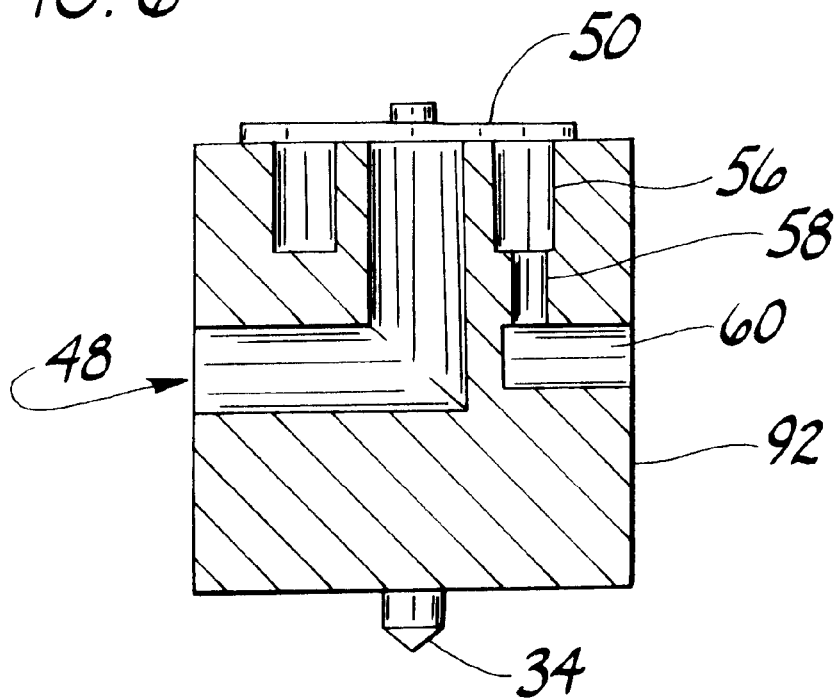

The modularity of the condensate removal device 10 of the present invention permits conversion of the same system into any of the embodiments described above, as well as a strictly thermodynamic trap or a straight-through fixed orifice trap. In that regard, a thermodynamic modular block 92 shown in FIG. 6 may be used which is identical to the modular block 32 of the first embodiment except that there is no fixed passageway through the bottom end. Similarly, a straight-through fixed passageway type modular block 94 as shown in FIG. 5, that does not have a thermodynamic operation capability nor a labyrinth configuration, may be used.

By removing the cover, and replacing the modular block in the transverse opening 26 with a selected modular block, a conversion is achieved. Thus, it may be seen that the invention permits rapid re-configuration of the system between dual operation, labyrinth configuration, thermodynamic operation and straight-through fixed orifice operation.

An operator of a steam system may choose the modular block that best suits the flow conditions. For instance, if load is expected to be relatively constant most of the time but occasionally increase substantially, the dual-mode trap modular block 32 of the first embodiment would be selected for its efficiency under constant load and its ability to vary capacity when needed. If large amounts of solid debris are expected, as in an older system that has much corrosion, a labyrinth configuration is chosen since it permits larger passageways that reduce the chance of clogging.

When flow conditions change or if the conditions were incorrectly estimated, the operator may quickly change to a modular block that is better suited. Thus the invention reduces maintenance time. It also permits a reduction in inventory, since there is no need to maintain a variety of complete condensate removal devices in stock but only to maintain a variety of relatively small modular blocks for the common body 12.

When maintenance is required, as to clean the trap or remove a clog, the modular block may be easily removed from the transverse opening 26 and the device repaired as needed while the body 12 stays threaded in-line. The mesh screen 18 may be cleaned by directing fluid toward the screen to dissolve accumulated deposits. Maintenance time is reduced because there is no need to break the pipe line to service the device.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A condensate removal device for removal of condensate from a fluid system comprising:
   a body adapted for connection to the fluid system, the body having an inflow opening, an outflow opening, and a transverse opening positioned generally between the inflow opening and the outflow opening;
   a trap between the inflow opening and the outflow opening for restricting flow of fluid from the fluid system entering the inflow opening to the outflow opening to permit the passage of liquid condensate but to inhibit the passage of gas, the trap comprising,
      a fixed passageway extending through the trap, the fixed passageway being constructed for continuous fluid communication between the inflow opening and the outflow opening through the trap;
      a variable passageway extending through the trap, the variable passageway being constructed to selectively permit fluid communication between the inflow opening and outflow opening through the variable passageway in correspondence with the amount of liquid condensate in the fluid system; and
      a modular block that contains the fixed and variable passageways, the block being sized and shaped for being received in the transverse opening.

2. A condensate removal device as set forth in claim 1 wherein the variable passageway includes an obstruction in the variable passageway movable between a closed position in which the obstruction blocks flow of fluid through the trap in the variable passageway and an open position in which the obstruction permits flow of fluid through the trap in the variable passageway.

3. The condensate removal device as set forth in claim 1 wherein the modular block is detachably removable from the transverse opening in the body.

4. A condensate removal device as set forth in claim 3 wherein the modular block constitutes a first modular block, and wherein the trap further comprises a second modular block selectively interchangeable in the transverse opening of the body with the first modular block.

5. A condensate removal device as set forth in claim 4 wherein the second modular block has a single passageway therein.

6. A condensate removal device as set forth in claim 5 wherein the single passageway in the second modular block is constructed for continuous fluid communication between the inflow opening and the outflow opening through the second modular block when received in the body, and the single passageway further has a labyrinth configuration.

7. A condensate removal device as set forth in claim 5 wherein the single passageway in the second modular block is constructed as a variable passageway to selectively permit fluid communication between the inflow opening and outflow opening through the variable passageway in correspondence with the amount of liquid condensate in the fluid system when the second modular block is received in the body.

8. A condensate removal device as set forth in claim 6 wherein the trap further comprises a third modular block having a single passageway therein.

9. A condensate removal device as set forth in claim 1 wherein the fixed passageway has a labyrinth configuration through the trap.

10. A condensate removal device for removal of condensate from a fluid system comprising:

a body adapted for connection to the fluid system, the body having an inflow opening, an outflow opening, and a transverse opening positioned generally between the inflow opening and the outflow opening;

a trap receivable in the transverse opening of the body between the inflow opening and the outflow opening for restricting flow of fluid from the fluid system entering the inflow opening to the outflow opening to permit the passage of liquid condensate but to inhibit the passage of gas; and a cover adapted for placement generally over the transverse opening and for releasable attachment to the body for holding the trap in the body;

wherein the trap comprises first, second and third modular blocks selectively interchangeable in the transverse opening, the first modular block having a fixed passageway extending through the trap, the fixed passageway being constructed for continuous fluid communication between the inflow opening and the outflow opening through the trap and a variable passageway extending through the trap, the variable passageway being constructed to selectively permit fluid communication between the inflow opening and outflow opening through the variable passageway in correspondence with the amount of liquid condensate in the fluid system, the second modular block having a single fixed passageway constructed for continuous fluid communication between the inflow opening and the outflow opening through the trap, the third modular block having a single variable passageway constructed to selectively permit fluid communication between the inflow opening and outflow opening through the variable passageway.

11. A condensate removal device as set forth in claim 10 wherein the fixed passageway of the second modular block has a labyrinth configuration so that the passageway is longer than a path extending straight through the trap to provide improved inhibition to passage of gas.

* * * * *